US006783261B2

(12) United States Patent
Simon

(10) Patent No.: US 6,783,261 B2
(45) Date of Patent: Aug. 31, 2004

(54) OPTICAL ASSEMBLIES FOR CONCENTRATION OF RADIAL LIGHT DISTRIBUTION WITHIN CONFINED LUMINAIRE PACKAGES

(76) Inventor: Jerome H. Simon, P.O. Box 590204, Newton Centre, MA (US) 02459

( * ) Notice: Subject to any disclaimer, the term of this patent is extended or adjusted under 35 U.S.C. 154(b) by 0 days.

(21) Appl. No.: 10/454,696

(22) Filed: Jun. 4, 2003

(65) Prior Publication Data

US 2004/0036014 A1 Feb. 26, 2004

Related U.S. Application Data

(60) Provisional application No. 60/385,928, filed on Jun. 5, 2002.

(51) Int. Cl.[7] .......................... F21V 7/00; G02B 27/30; G02B 5/10

(52) U.S. Cl. ....................... 362/299; 362/298; 362/301; 362/302; 359/641; 359/853

(58) Field of Search ................................ 359/619, 641, 359/850, 851, 853; 362/298, 299, 301, 302

(56) References Cited

U.S. PATENT DOCUMENTS

| | | | | |
|---|---|---|---|---|
| 1,900,436 A | 3/1933 | Dourgnon | 362/290 |
| 2,344,221 A | 3/1944 | Trautner | 362/287 |
| 2,359,151 A | 9/1944 | Pennow | 362/267 |
| 2,454,332 A | 11/1948 | Mitchell et al. | 362/337 |
| 3,739,169 A | 6/1973 | Weinreich | 362/542 |
| 4,159,511 A | 6/1979 | Dejonc | 362/299 |
| 4,264,948 A | 4/1981 | Cherouge | 362/311 |
| 4,962,450 A | 10/1990 | Reshetin | 362/268 |
| 4,969,074 A | 11/1990 | Davis et al. | 362/329 |
| 5,897,201 A | 4/1999 | Simon | 362/268 |
| 5,915,823 A | 6/1999 | Simon | 362/511 |
| 6,027,231 A | 2/2000 | Fouke | 362/309 |
| 6,354,725 B1 | 3/2002 | Simon | 362/576 |
| 6,361,191 B1 | 3/2002 | Simon | 362/328 |
| 6,502,964 B1 | 1/2003 | Simon | 364/328 |
| 6,536,921 B1 | 3/2003 | Simon | 362/277 |
| 6,540,382 B1 | 4/2003 | Simon | 362/339 |
| 6,616,305 B1 | 9/2003 | Simon | 364/309 |

*Primary Examiner*—Georgia Epps
*Assistant Examiner*—Jack Dinh
(74) *Attorney, Agent, or Firm*—Perkins Smith Cohen LLP; Harvey Kaye; Jerry Cohen

(57) ABSTRACT

An optical assembly for architectural illumination which includes a quasi point source surrounded by a collimating ring lens designed to radially project collimated beams. A segmented, off axis, parabolic reflector to collect and reflect light (not gathered by the collimating ring lens) as collimated beams and a ring reflector, the segments of which designed to gather beams from both the collimating ring lens and the off axis reflector and the direct them in substantially the same direction.

15 Claims, 5 Drawing Sheets

OPTICAL ASSEMBLIES FOR CONCENTRATION OF RADIAL LIGHT DISTRIBUTION WITHIN CONFINED LUMINAIRE PACKAGES

REFERENCE TO RELATED APPLICATIONS

The present application is based on and claims the priority of provisional application, Serial No. 60/385,928 filed Jun. 5, 2002. The substance of that application is hereby incorporated herein by reference.

FIELD OF INVENTION

The present invention relates generally to the lighting field, and, more particularly to creating fixtures that provide broad, evenly distributed illumination from quasi point source lamps.

SUMMARY OF INVENTION

It is an object of the present invention to provide efficient, highly directable light for broad, evenly distributed illumination over various architectural surfaces.

It is another object of the present invention to provide sharp light cutoff from the luminaire to decrease glare.

It is yet another object of the present invention to shape surface illumination patterns.

It is yet a further object of the present invention to project a majority of the flux provided by a quasi point source lamp in a unified direction.

It is yet another object of the present invention to produce a compact optical system to reduce luminaire depth.

A quasi point source is surrounded by a collimating ring lens having cylindrical lens segments disposed vertically on the internal surface of the lens. These cylindrical segments divide the radially collimated light from the ring lens into individually collimated beams that radiate from the ring lens in a substantially circular pattern. Located at an opened end of the ring cylindrical lens is an off axis parabolic or ellipsoidal reflector ring having radially concave segments which divide the reflected radial beam into individually collimated beams. The conical surfaces of the off axis reflectors axis the cylindrical surfaces of the ring lens are rotated in respect to each other so that the reflected and refracted beams radiate alternately, further surrounding and substantially concentric to the ring lens and the off axis reflector is a reflection ring comprised of individual reflector segments. The positions of these reflector segments of the ring correspond to the radial beams as described above, and are alternately angled so as to reflect. The alternate beams from both the ring lens and the off axis reflector are in substantially the same direction.

These and other objects, features and advantages will be apparent from the following detailed description of preferred embodiments taken in conjunction with the accompanying drawings in which:

BRIEF DESCRIPTION OF THE DRAWINGS

FIG. 5–1 is a partial view of a segmented reflector ring as shown in FIG. 4 in which the segments are cylindrically concave.

FIG. 5–2 is a partial view of a segmented reflector ring as shown in FIG. 4 in which the segments are cylindrically convex.

FIG. 5–3 is a partial view of a segmented reflector as shown in FIG. 4 in which some segments are cylindrically concave and others are cylindrically convex.

DETAILED DESCRIPTION OF THE DRAWINGS

Figure 1:
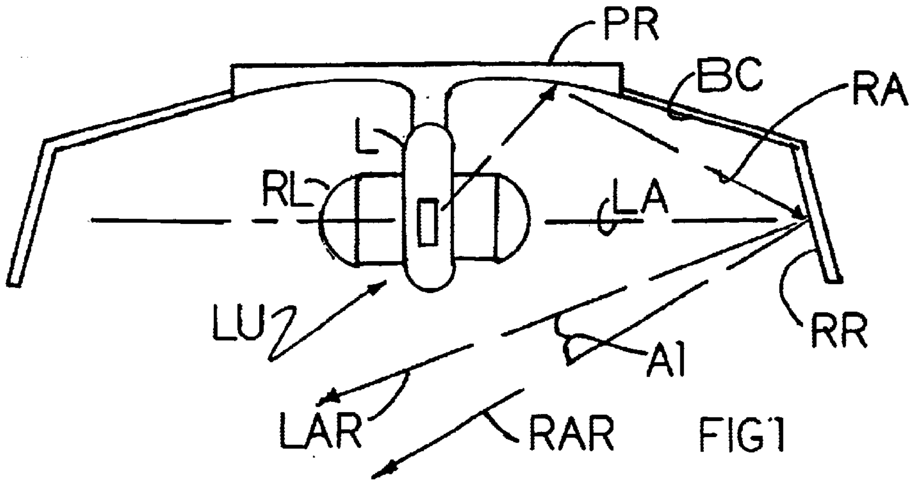
FIG. 1 is a diagrammatic view of an optical system, and defines the problem the present invention overcomes, namely, to gather a majority of the flux from a lamp and focus it towards a defined target area.

FIG. 1 is a cross-sectional diagram illustrating an optical system that defines the problem the present invention is designed to overcome. This said optical system contains a lamp L surrounded by ring collimating lens RL further surrounded by reflector ring RR. An off-axis parabolic reflector PR collects light rays RA, which are not gathered or collected by RL. Both refracted rays LA from RL and reflected ray RA from PR are directed toward and reflected by RR. Since RA and LA strike RR at different and converging angles, they are reflected by RR as diverging rays LAR and RAR respectively. This divergence, as represented by angle A-1, does not satisfy the requirement of luminaire LU to direct a majority of the radiant flux of L to a narrow target area. BC is a mechanical connection between PR and RR.

Figure 2:
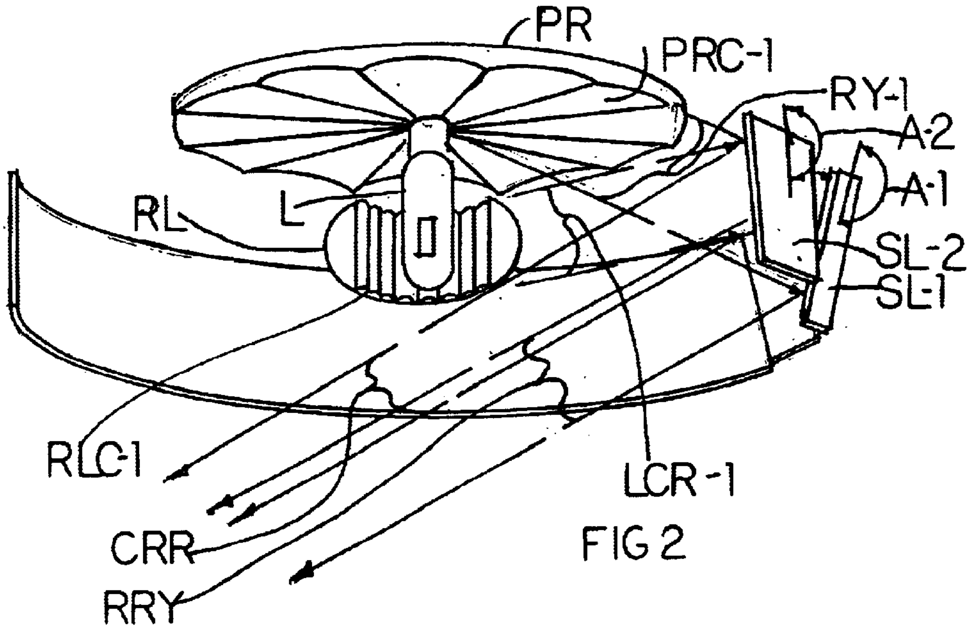
FIG. 2 is an isometric view representing a method of collecting and concentrating a majority of the flux from a lamp and projecting it in a narrow beam at an acute angle from the fixture.

FIG. 2 is a three-dimensional diagram representing a method of collecting and concentrating a majority of flux from lamp L and concentrating and projecting it in a narrow band at an acute angle to the fixture. This result is illustrated in diagram FIG. 3. This is achieved by adding a ring of vertical positive cylindrical surfaces RLC-1 to the inside of RL. This produces a narrow band of radially collimated beams R4-1 represented by LCR1 out and onto composite reflector ring RR. Off-axis parabolic reflector PR is also segmented into radially collimating elements by adding concave surfaces represented by PRC-1, which projects a narrow band of radially collimated beams RY-1 toward and onto RR. The cylindrical surface RLC-1 of RL and concave surface PRC-1 of PR are radially offset from each other (as illustrated in plan diagram of FIG. 4), and therefore strike RR at different radial angles, allowing RR to be divided into individual alternating segments represented by SL-1 and SL-2, which are set at different reflecting angles from each other, as represented by angles A1 and A2, angle A1 being greater than A2. Therefore, by directing radial beams LCR-1 and PRC-1 at segments SL-1 and SL-2 respectively, they can be made to reflect at the same conical angle from reflective composite ring RR, represented by conically parallel beams CRR and RRY toward and onto a common target area.

Figure 3:
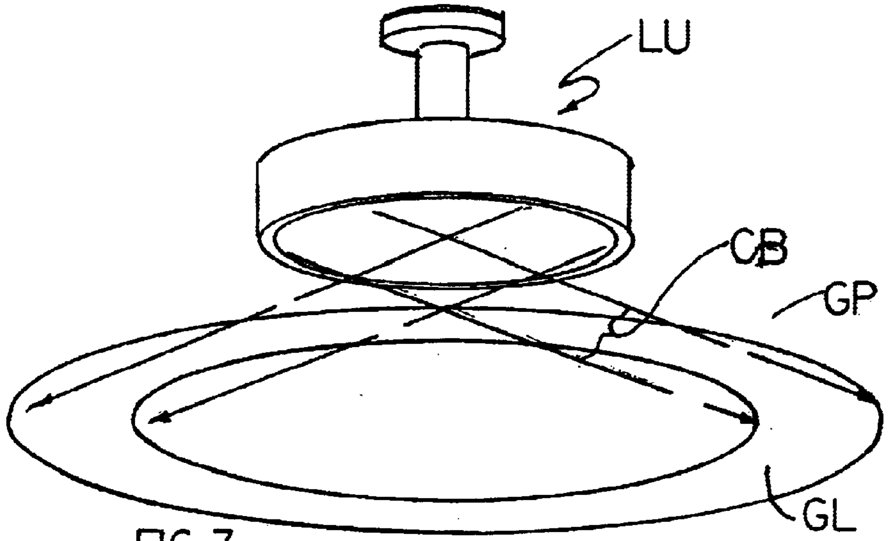
FIG. 3 is a diagrammatic view which illustrates the functionality of a luminaire containing the optical system shown in FIG. 2.

FIG. 3 illustrates a luminaire LU containing an optical system as described in FIG. 2, projecting a radial beam CB as a concentrated area of illumination GL onto ground plane GP.

Figure 4:
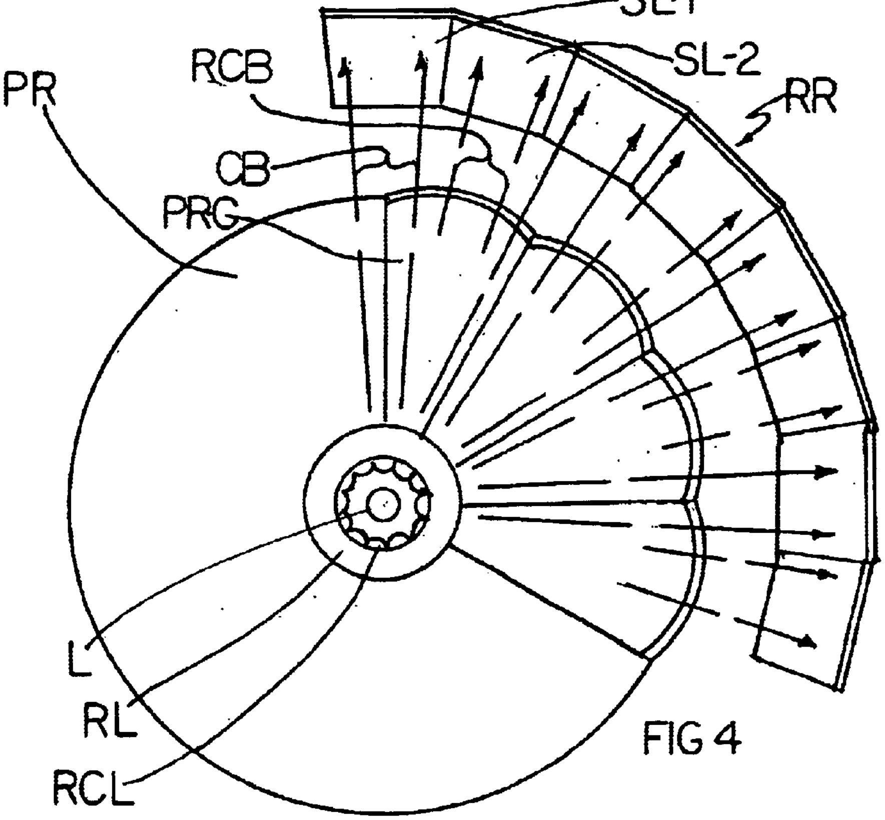
FIG. 4 is a plan view of the optical system shown in FIG. 2.

FIG. 4 is a plan view of the optical system described in FIG. 2. Light from L is gathered and projected into collimated beams CB and RL combined, and RCL toward and onto reflector segment SL-1. Light not collected by RL and collected by PR is projected by segments PRC as collimated beams RCB onto reflector segment SL-2.

Surfaces of SL-1 and SL-2 may be diffused, have V grooves or flutes, or may be convex or concave. The functions of these surface variations are illustrated in FIGS. 5–1, 5–2, and 5–3.

Figures 1, 5:
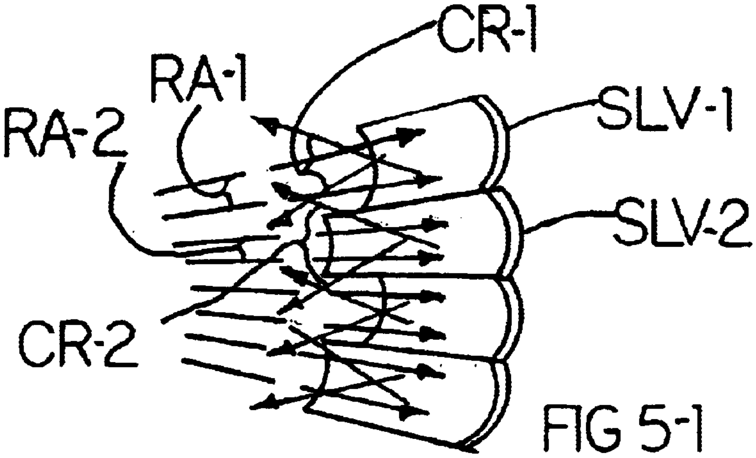
Figures 2, 5:
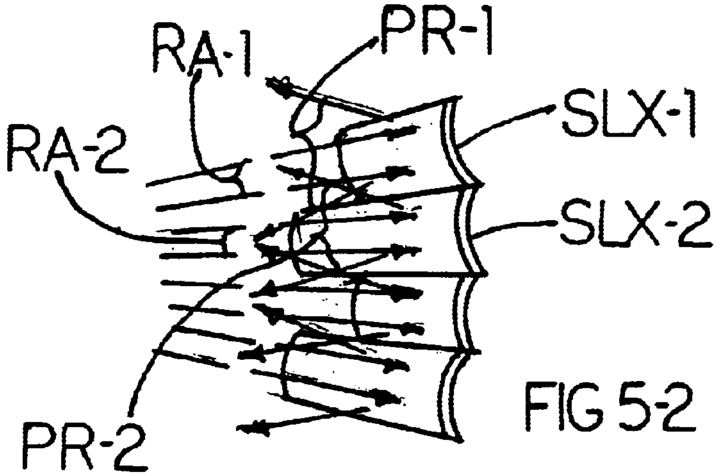
Figures 3, 5:
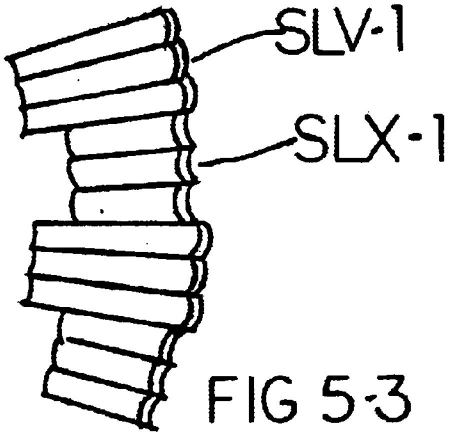

FIG. 5–1 is a partial view of a segmented reflector ring as described in FIG. 4, the segments of which, typically SLV-1 and SLV-2 are cylindrical concave, focusing and reflecting incoming rays RA-1 and RA-2 as converging then diverging rays CR-1 and CR-2 respectively.

FIG. 5–2 is a partial view of a segmented reflector ring as described in FIG. 4, the segments of which typically SLX-1 and SLX-2 are cylindrically convex, reflecting rays RA-1 and RA-2 as diverging rays DR-1 and DR-2 respectively.

FIG. 5–3 is a partial view of a segmented reflector ring as described in FIG. 4, the segments of which SLV-1 and SLX-1 function as SLV-1 of FIG. 5–1 and SLX-1 of FIG. 5–2 respectively, and are alternately placed to form the composite reflector RR of FIG. 4.

Figure 6:
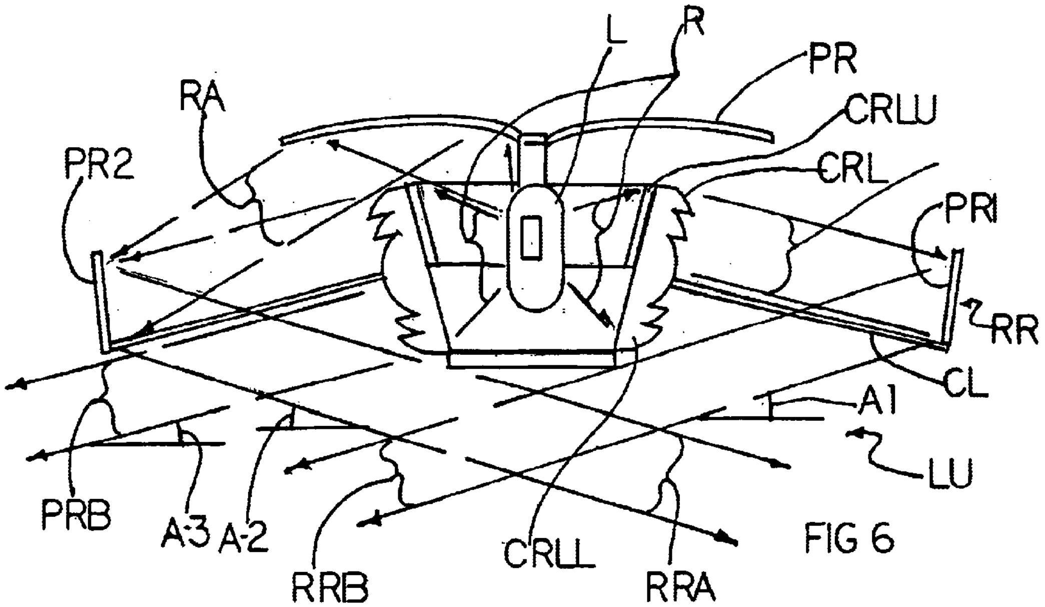
FIG. 6 is a cross-sectional view of a variation of the luminaire illustrated in FIG. 2.

FIG. 6 is a cross-sectional of a luminaire LU, which is a variation of the luminaire illustrated in FIG. 2. Light rays R emanating from lamp L are collected and projected through canted lens CRL. Radially canted beam PRB projected by the lower portion of CRL (CRLL) are unobstructed by components of LU. The cant angle of PRB is represented by angle A-3. The upper portion of CRL (CRLU), having a ring of positive cylindrical surfaces (as described in FIG. 2), projects radially canted beams PRT onto reflector segments PR1 (the function of which are described in FIG. 2) of reflector ring RR, which are reflected by RR1 as canted rays RRB at a cant angle represented by angle A-1.

Rays RA, reflected by parabolic ring reflector PR onto reflector segments PR2 (the function of PR and RR-2 are described in FIG. 2), are reflected as canted rays RRA at a cant angle A-2. Cant angles A-1, A-2, and A-3 are substantially equal or at highly acute angles from each other so that rays PRB, RRA, and RRB are projected approximately toward the same target areas as shown in FIG. 3. Lower lens LL has the function of spreading light from this lamp evenly below the luminaire. CL is substantially clear and has a support and sealing function.

Figure 7:
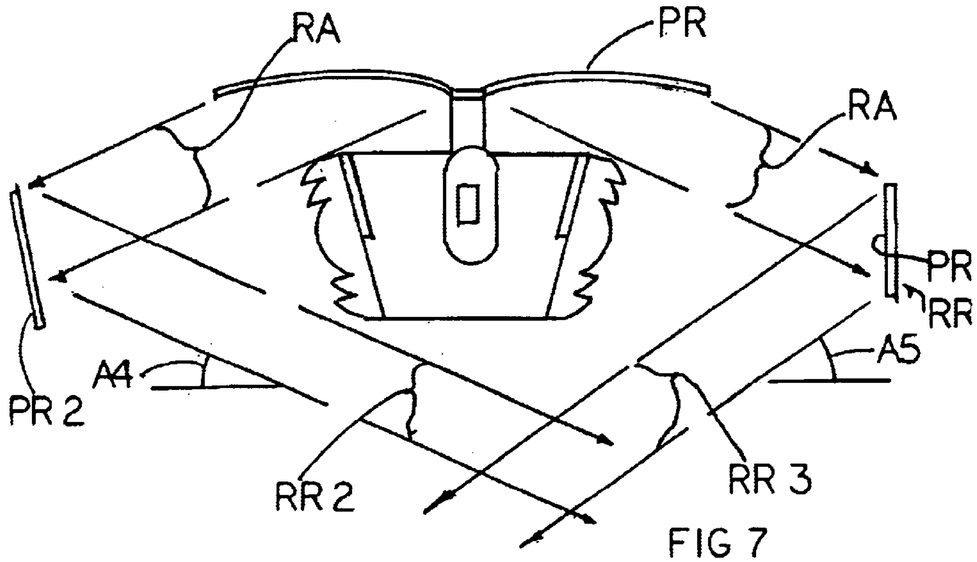
FIG. 7 is a cross-sectional diagram of FIG. 6.

FIG. 7 is a cross-sectional diagram of FIG. 6. In some optical configurations the surface of parabolic reflector ring PR can have a radially substantially continuous cross-section that is not segmented. In this configuration, radially reflected rays RA would strike both segments PR1 and PR2 of RR. In this case the cant angle A-4 of reflector rays RR2 would be more acute than the cant angle A-5 of reflected rays RR3.

Figure 8:
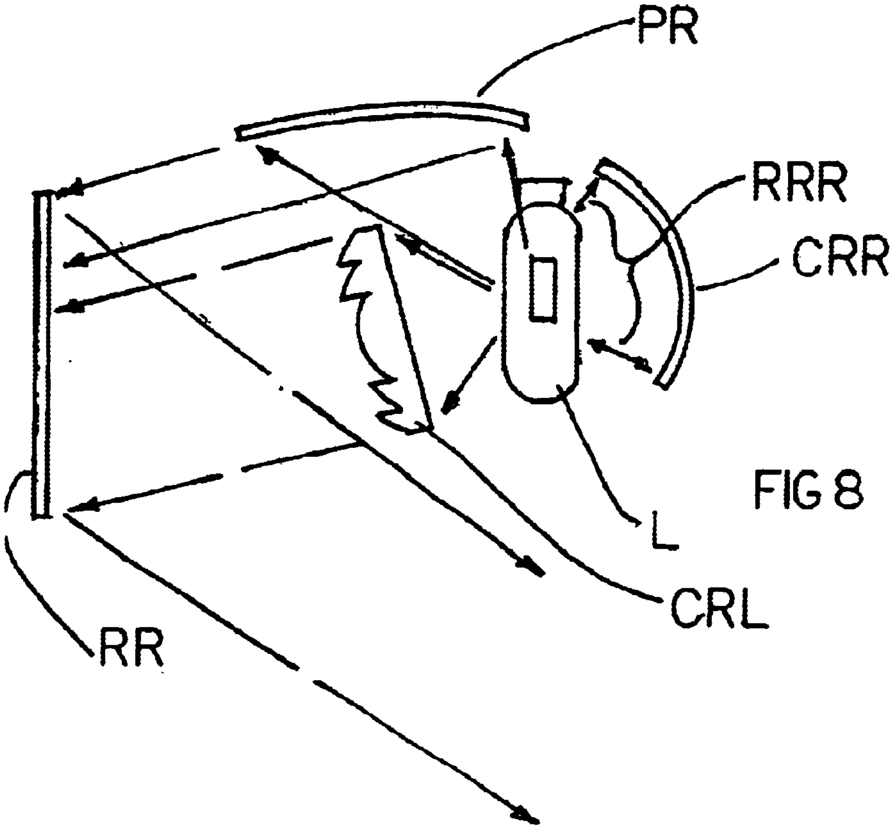
FIG. 8 is a cross-sectional diagram partially illustrating FIG. 6 and FIG. 7.

FIG. 8 is a cross-sectional diagram partially illustrating FIGS. 6 and 7 and further introducing a ring reflector CRR (having a circular section), which intercepts and reflects a radial segment of radiant light RRR from L back through L and onto PR and CRL, further reflected and refracted respectively onto RR.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claim is:

1. An optical system designed to collect and project a majority of the radiant flux from a quasi point source lamp as a substantially radial beam, comprising:

a. a collimating ring lens at least partially surrounding a quasi point light source and segmented so as to project collimated radial beams;

b. an off axis parabolic reflector of radially collimating segments;

c. a reflecting ring of individual reflecting elements, some of which relieve and reflect beams projected from the collimating ring lens, some of which relieve and reflect light from sections of the off axis parabolic reflector.

2. An optical system as defined in claim 1 wherein the collimating ring lens has a fresnel section.

3. An optical system as defined in claim 1 wherein the collimating ring lens is aspheric in section.

4. An optical system as defined in claim 1 wherein the collimating ring lens is spherical in section.

5. An optical system as defined in claim 1 wherein the collimating ring lens is comprised of individual collimating lenses.

6. An optical system as defined in claim 1 wherein the inner surface (entry surface) of the collimating ring lens is comprised of vertically disposed positive cylindrical surface.

7. An optical system as defined in claim 1 wherein the cylindrical lens segments are disposed on a portion of the internal face of the collimating ring lens.

8. An optical system as defined in claim 1 wherein the cylindrical segments of the collimating ring lens and the radially collimating segments of the reflector are radially offset from each other so that their respectively refracted and reflective beams are offset from each other.

9. An optical system as defined in claim 1 wherein the individual reflecting segments, those reflecting beams from the collimating ring lens axis those receiving beams from the off axis parabolic reflectors are alternately disposed about the reflecting ring.

10. An optical system as defined in claim 1 wherein the individual segments of the reflector ring have substantially flat surfaces.

11. An optical system as defined in claim 1 wherein the individual segments of the reflector ring are cylindrically concave.

12. An optical system as defined in claim 1 wherein the individual segments of the reflector ring are cylindrically convex.

13. An optical system as defined in claim 1 wherein the individual segments of the reflector ring have both cylindrically convex and concave surfaces.

14. An optical system as defined in claim 1 wherein the optical system is only comprised of a radial portion of the collimating ring lens, a radial portion of the off axis reflector and a radial portion of the reflector ring.

a reflector ring segment disposed radially opposite the collimating ring segment for redirecting light back through the collimating ring segment.

15. An optical system as defined in claim 1 wherein the collimating ring lens is conical to project beams in a radially conical direction.

* * * * *